US008323099B2

(12) United States Patent
Durham et al.

(10) Patent No.: US 8,323,099 B2
(45) Date of Patent: Dec. 4, 2012

(54) ASSOCIATING PORTABLE WAGERING GAME MACHINES WITH A STATIONARY WAGERING GAME MACHINE

(75) Inventors: Timothy J. Durham, Oak Park, IL (US); Mark B. Gagner, West Chicago, IL (US); Larry J. Pacey, Northbrook, IL (US); James M. Rasmussen, Chicago, IL (US); Craig J. Sylla, Round Lake, IL (US)

(73) Assignee: WMS Gaming, Inc., Waukegan, IL (US)

( * ) Notice: Subject to any disclaimer, the term of this patent is extended or adjusted under 35 U.S.C. 154(b) by 241 days.

(21) Appl. No.: 12/674,400

(22) PCT Filed: Aug. 20, 2008

(86) PCT No.: PCT/US2008/073645
§ 371 (c)(1),
(2), (4) Date: Feb. 19, 2010

(87) PCT Pub. No.: WO2009/026320
PCT Pub. Date: Feb. 26, 2009

(65) Prior Publication Data

US 2011/0124401 A1 May 26, 2011

Related U.S. Application Data

(60) Provisional application No. 60/957,039, filed on Aug. 21, 2007.

(51) Int. Cl.

| | |
|---|---|
| ***A63F 13/00*** | (2006.01) |
| ***A63F 9/24*** | (2006.01) |
| ***G06F 17/00*** | (2006.01) |
| ***G06F 19/00*** | (2006.01) |
| *A63F 13/12* | (2006.01) |

(52) U.S. Cl. ................ 463/25; 463/16; 463/23; 463/40; 463/42; 273/138.1; 273/138.2; 273/454; 273/460; 705/67; 705/75; 705/78; 709/203; 709/207; 713/155

(58) Field of Classification Search .............. 463/16–23, 463/25–33, 39–43; 273/138.1, 139, 138.2, 273/141 A, 454–456, 460; 705/56–57, 64, 705/67, 72, 74–75, 78–79; 709/203–207, 709/FOR. 113; 713/1, 100, 150, 155, 170, 713/176, 182–184, 186–189, 300, 375, 400, 713/500, 600; 902/2–3, 23, 38, 40; *A63F 13/00, 13/12, 9/24; G06F 17/00, 19/00*
See application file for complete search history.

(56) References Cited

U.S. PATENT DOCUMENTS 5,470,079 A * 11/1995 LeStrange et al. .............. 463/25

(Continued)

OTHER PUBLICATIONS

"PCT Application No. PCT/US08/73645 International Search Report", Nov. 3, 2008 , 12 pages.

(Continued)

*Primary Examiner* — Arthur O. Hall
(74) *Attorney, Agent, or Firm* — DeLizio Gilliam, PLLC

(57) ABSTRACT

Embodiments of a portable wagering game machine and a stationary wagering game machine are described herein. In one embodiment, a plurality of portable wagering game machines are associated with a stationary wagering game machine. Group wagering game data is displayed on the stationary wagering game machine. The group wagering game data includes wagering content for viewing by multiple players. At each of the plurality of portable wagering game machines, individual wagering game data is displayed. The individual wagering game data and the group wagering game data relate to a wagering game.

10 Claims, 11 Drawing Sheets

U.S. PATENT DOCUMENTS

| | | | | |
|---|---|---|---|---|
| 5,741,183 | A | 4/1998 | Acres et al. | |
| 5,937,390 | A | 8/1999 | Hyodo | |
| 6,089,975 | A | 7/2000 | Dunn | |
| 6,110,043 | A * | 8/2000 | Olsen | 463/27 |
| 6,315,666 | B1 | 11/2001 | Mastera et al. | |
| 6,676,522 | B2 | 1/2004 | Rowe et al. | |
| 6,712,698 | B2 | 3/2004 | Paulsen et al. | |
| 2004/0214641 | A1 | 10/2004 | Giobbi | |
| 2006/0035707 | A1 * | 2/2006 | Nguyen et al. | 463/29 |
| 2007/0087804 | A1 | 4/2007 | Knowles et al. | |
| 2007/0243925 | A1 * | 10/2007 | LeMay et al. | 463/20 |
| 2008/0096659 | A1 * | 4/2008 | Kreloff et al. | 463/39 |
| 2008/0108405 | A1 * | 5/2008 | Brosnan et al. | 463/16 |
| 2009/0131146 | A1 * | 5/2009 | Arezina et al. | 463/20 |
| 2009/0138133 | A1 * | 5/2009 | Buchholz et al. | 700/295 |
| 2009/0176559 | A1 * | 7/2009 | Buchholz et al. | 463/25 |
| 2009/0197673 | A1 * | 8/2009 | Bone et al. | 463/25 |
| 2009/0239657 | A1 * | 9/2009 | Ryan et al. | 463/25 |
| 2010/0222141 | A1 * | 9/2010 | LaSalvia et al. | 463/29 |
| 2010/0227670 | A1 * | 9/2010 | Arezina et al. | 463/25 |
| 2010/0234097 | A1 * | 9/2010 | Gelber et al. | 463/25 |
| 2012/0129611 | A1 * | 5/2012 | Rasmussen et al. | 463/43 |

OTHER PUBLICATIONS

"PCT Application No. PCT/US08/73645 International Preliminary Report on Patentability", Sep. 7, 2010 , 14 pages.

* cited by examiner

ASSOCIATING PORTABLE WAGERING GAME MACHINES WITH A STATIONARY WAGERING GAME MACHINE

RELATED APPLICATIONS

This application claims the priority benefit of U.S. Provisional Application Ser. No. 60/957,039 filed Aug. 21, 2007.

FIELD

Embodiments of the invention generally relate to the field of wagering game machines, and, more particularly, to a portable wagering game machine and a stationary wagering game machine.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises associating a plurality of portable wagering game machines with a stationary wagering game machine; displaying group wagering game data on the stationary wagering game machine, wherein the group wagering game data includes wagering content for viewing by multiple players; and displaying at each of the plurality of portable wagering game machines individual wagering game data, wherein the individual wagering game data and the group wagering game data relate to a wagering game.

In some embodiments, the method further comprises transmitting the individual wagering game data from the plurality of wagering game machines to the stationary wagering game machine; and modifying the group wagering game data based, at least in part, on the transmitted individual wager game data.

In some embodiments, the method further comprises transmitting the individual wagering game data to the plurality of portable wagering game machines.

In some embodiments, the method further comprises a first of the plurality of portable wagering game machines invoking a first game event based, at least in part, on detecting a game event that occurs on the stationary wagering game machine.

In some embodiments, the method further comprises a first of the plurality of portable wagering game machines transmitting a service request to a hospitality services system, wherein the service request indicates the stationary wagering game machine.

In some embodiments, the method further comprises a first of the plurality of portable wagering game machines publishing hospitality service information after a lack of activity at the first portable wagering game machine.

In some embodiments, the method further comprises electronically transferring funds with a first of the plurality of portable wagering game machines; and making transferred funds available for gaming on the stationary wagering game machine.

In some embodiments, the method further comprises configuring the stationary wagering game machine with a first of the plurality of portable wagering game machines.

In some embodiments, a method of invoking a game event at a portable wagering game machine comprises monitoring a stationary wagering game machine for occurrence of a first game event; detecting occurrence of the first game event at the stationary wagering game machine; and invoking a second game event at the portable wagering game machine in response to said detecting occurrence of the first game event.

In some embodiments, said monitoring comprises monitoring output from the stationary wagering game machine, wherein the output indicates the first game event.

In some embodiments, the output is selected from a set consisting essentially of audio, signals that control a step motor, a message from the stationary wagering game machine to an accounting system, and one or more signals that indicate position of reels in the stationary wagering game machine.

In some embodiments, the second game event is selected from a set consisting essentially of a bonus round and a cumulative game event.

In some embodiments, a method comprises determining that a portable wagering game machine has been inactive for a given time period; transmitting information that corresponds to a profile of a user to a hospitality services system; receiving hospitality services related information, wherein the received hospitality services related information is based on the profile of the user; publishing the received hospitality services related information.

In some embodiments, said publishing is selected from a set consisting essentially of emitting audio, displaying text, displaying animation, displaying video, and displaying images.

In some embodiments, the method further comprises the hospitality services system searching a database of hospitality services related information based on the profile of the user.

In some embodiments, a method comprises detecting activation of a hospitality services menu at a portable wagering game machine; generating a service request with information that identifies a stationary wagering game machine associated with the portable wagering game machine and with hospitality services request information based on input to the hospitality services menu; and transmitting the service request to a hospitality services system.

In some embodiments, the method further comprises receiving a service request identifier from the hospitality services system for tracking the service request.

In some embodiments, the method further comprises determining that the portable wagering game machine is no longer associated with the stationary wagering game machine; and transmitting a notification to the hospitality services system indicating that the portable wagering game machine is no longer associated with the stationary wagering game machine, wherein the notification includes the service request identifier.

In some embodiments, the method further comprises transmitting a second notification to the hospitality services system indicating association of the portable wagering game machine with a different stationary wagering game machine, wherein the second notification includes the service request identifier and information that identifies the second stationary wagering game machine.

In some embodiments, the method further comprises the hospitality services system determining location of the portable wagering game machine based on the information that identifies the stationary wagering game machine for delivery of hospitality services.

In some embodiments, a method comprises transmitting an electronic funds transfer request from a portable wagering game machine that is associated with a stationary wagering game machine; receiving an indication of electronically transferred funds at the portable wagering game machine in response to the transmitted electronic funds transfer request; and indicating at least a portion of the electronically transferred funds to the stationary wagering game machine as available.

In some embodiments, the method further comprises updating the indicated available portion of the electronically transferred funds in accordance with wagering game results at the stationary wagering game machine.

In some embodiments, the method further comprises the stationary wagering game machine communicating said updating to the portable wagering game machine.

In some embodiments, the method further comprises the stationary wagering game machine maintaining an indication of the portable wagering game machine as a source of the indicated available funds.

In some embodiments, a portable wagering game machine comprises an interface operable to associate the portable wagering game machine with a stationary wagering game machine; a set of one or more processor units operable to execute instructions encoded in a machine-readable media; and one or more machine readable media encoded with instructions for execution by the set of one or more processor units, the instructions including a first set of instructions executable to detect a first game event at the stationary wagering game machine associated with the portable wagering game machine, and a second set of instructions executable to determine if a second game event is associated with the first game event and to invoke the second game event if associated with the first game event and if the first game event is detected.

In some embodiments, the portable wagering game machine further comprises a display operable to display the second game event.

In some embodiments, a stationary wagering game machine comprises a set of speakers operable to output audio; a set of processing components operable to conduct a wagering game and indicate wagering game events; and an interface operable to associate the stationary wagering game machine with a portable wagering game machine and operable to communicate wagering game events to the portable wagering game machine associated with the stationary wagering game machine.

In some embodiments, the stationary wagering game machine further comprises mechanized reels.

In some embodiments, a program product encoded in one or more machine-readable media, the program product, when executed by a set of one or more processing units, causing the set of one or more processing units to perform operations that comprise monitoring a stationary wagering game machine for occurrence of a first game event; detecting occurrence of the first game event at the stationary wagering game machine; and invoking a second game event at the portable wagering game machine in response to said detecting occurrence of the first game event.

In some embodiments, said monitoring operation comprises monitoring output from the stationary wagering game machine, wherein the output indicates the first game event.

In some embodiments, the output is selected from a set consisting essentially of audio, signals that control a step motor, a message from the stationary wagering game machine to an accounting system, and one or more signals that indicate position of reels in the stationary wagering game machine.

In some embodiments, the second game event is selected from a set consisting essentially of a bonus round and a cumulative game event.

In some embodiments, a program product encoded in one or more machine-readable media is described. In some embodiments, the program product, when executed by a set of one or more processing units, can cause the set of one or more processing units to perform operations that comprise detecting activation of a hospitality services menu at a portable wagering game machine, generating a service request with information that identifies a stationary wagering game machine associated with the portable wagering game machine and with hospitality services request information based on input to the hospitality services menu, and transmitting the service request to a hospitality services system.

In some embodiments, the operations further comprise receiving a service request identifier from the hospitality services system for tracking the service request.

In some embodiments, the operations further comprise determining that the portable wagering game machine is no longer associated with the stationary wagering game machine; and transmitting a notification to the hospitality services system indicating that the portable wagering game machine is no longer associated with the stationary wagering game machine, wherein the notification includes the service request identifier.

In some embodiments, the operations further comprise transmitting a second notification to the hospitality services system indicating association of the portable wagering game machine with a different stationary wagering game machine, wherein the second notification includes the service request identifier and information that identifies the second stationary wagering game machine.

BRIEF DESCRIPTION OF THE DRAWINGS

The present embodiments may be better understood, and their numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present embodiments. However, it is understood that the described embodiments may be practiced without these specific details. For instance, well-known instruction instances, protocols, structures and techniques have not been shown in detail in order not to obfuscate the description.

The term "docking" is used in the specification. The term "docking" is typically used to describe the physical coupling of two devices. Although "docking" as used herein includes the physical coupling of a portable wagering game machine and a stationary wagering game machine, the term is also used to encompass various techniques for associating a portable wagering game machine ("PGM") with a stationary wagering game machine ("SGM"). For example, a PGM may be associated with a SGM in a non-physical manner (e.g., in accordance with 801.11g, using RFID technology, etc.).

Docking a portable wagering game machine with a stationary wagering game machine allows a wagering game experience to be provided to a user with both the portable wagering game machine and the stationary wagering game machine. The resources of both wagering game machines are used to deliver a wagering game experience that the machines may not be capable of delivering individually. For instance, game content of a portable wagering game machine may supplement and/or augment the game content of a stationary wagering game machine. As another example, a portable wagering game machine may add functionality that is auxiliary to gaming to a stationary wagering game machine (e.g., electronic funds transfer, location determination for hospitality services, etc.). As depicted in the figures below, docking a portable wagering game machine with a stationary wagering game machine allows flexibility and new opportunities in delivery of a wagering game experience.

Figure 1:
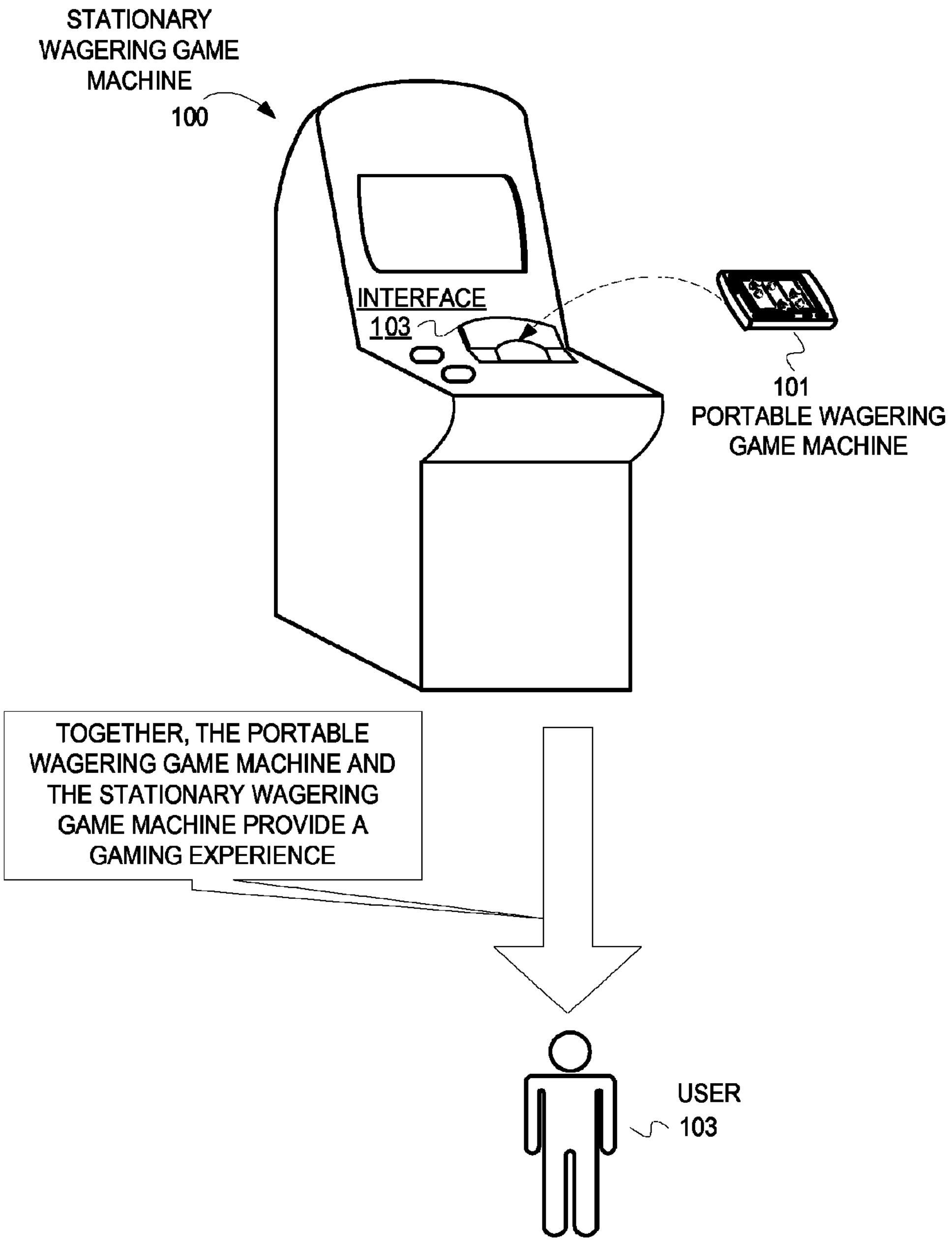
FIG. 1 depicts a portable wagering game machine and a stationary wagering game machine providing a wagering game experience to a user.

FIG. 1 depicts a portable wagering game machine and a stationary wagering game machine providing a wagering game experience to a user. A portable wagering game machine 101 is docked with a stationary wagering game machine 100 via an interface 103 on the SGM 100. Together, the PGM 101 and the SGM 100 provide a gaming experience to a user 103. The gaming experience is provided with the resources of both the PGM 101 and the SGM 100. For example, the larger display of the SGM 100 may be leveraged to display content from the PGM 101. In another example, a wireless communication port of the PGM 101 is leveraged by the SGM to transmit or receive data used and/or displayed by the SGM 100. This pooling of resources allows a legacy SGM to take advantage of the resources of a PGM.

Figure 2:
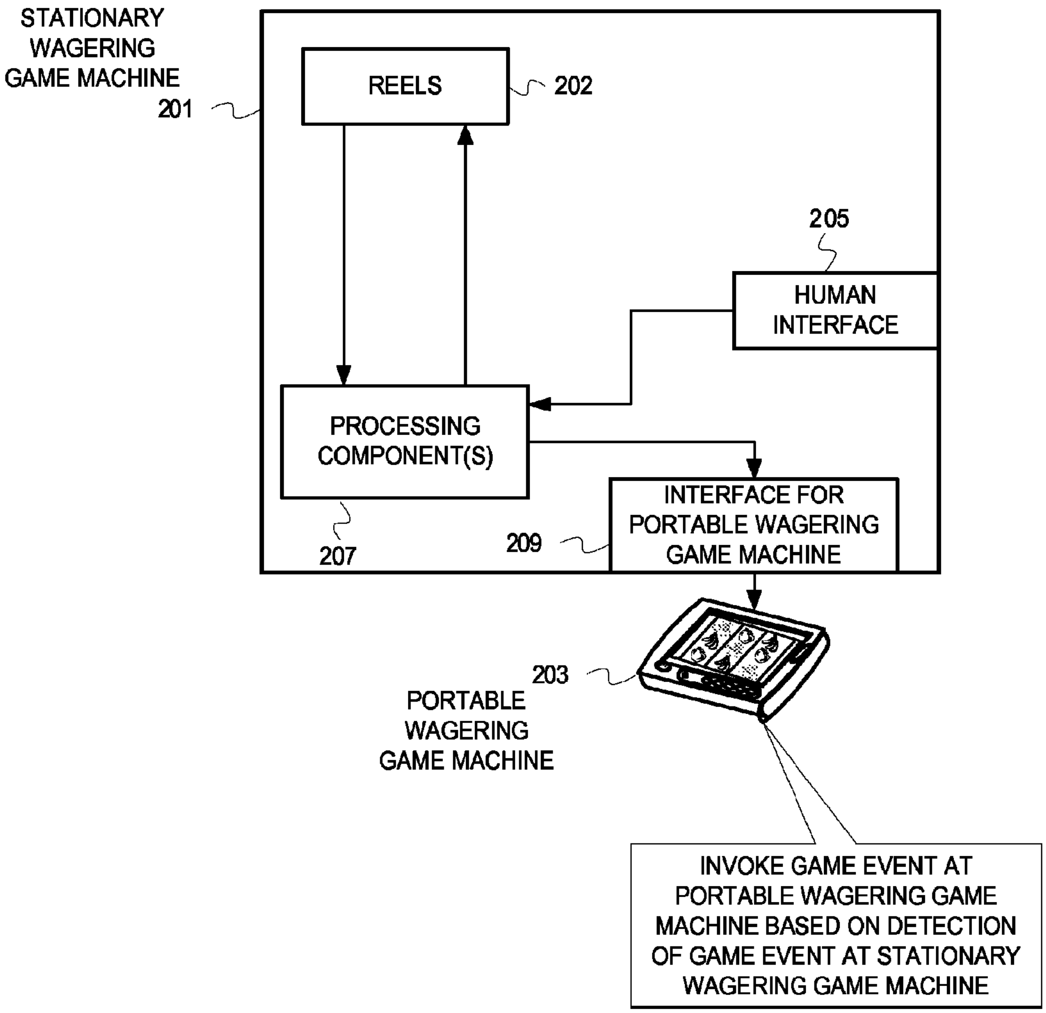
FIG. 2 depicts pooling resources of a stationary wagering game machine and a portable wagering game machine to provide game content from both machines.

FIG. 2 depicts pooling resources of a stationary wagering game machine and a portable wagering game machine to provide game content from both machines. A stationary wagering game machine 201 includes reels 202, processing components 207, a human interface 205 (e.g., button, handle, etc.), and an interface 209 for a portable wagering game machine. A portable wagering game machine 203 is associated with the stationary wagering game machine 201 via the interface 209. The interface 209 allows the portable wagering game machine 203 to monitor the SGM 201 and detect game events that occur at the SGM 201. The PGM 203 invokes game events at the PGM 203 responsive to detecting game events that occur at the SGM 201.

The PGM 203 can use different techniques to detect game events that occur at the SGM 201, which can vary based on the type of SGM (e.g., reels controlled by a computer and step motors, position of reels detected with metal contacts that close a circuit, reel position determined with photoelectric cells, etc.). In one embodiment, the PGM 203 may interpret signals sent from the processing components 207 to step motors that control the reels 202. In another embodiment, the electric signals that indicate reel position are sent to the PGM 203 for interpretation. In yet another embodiment, the PGM 203 monitors communications from the SGM 201 to an accounting system to determine if a game event occurs.

The PGM 203 may monitor communications from the SGM 201 to an accounting system with different techniques. For example, the same messages may be sent out of two ports on the SGM 201, one for the accounting system and one for the PGM 203. The PGM 203 may monitor an internal bus of the SGM 201 to detect messages to an accounting system that indicates reel stop. In another example, the PGM 203 registers with the accounting system and identifies the associated SGM 201. The accounting system then communicates game events to the PGM 203 for the SGM 201.

Figure 3:
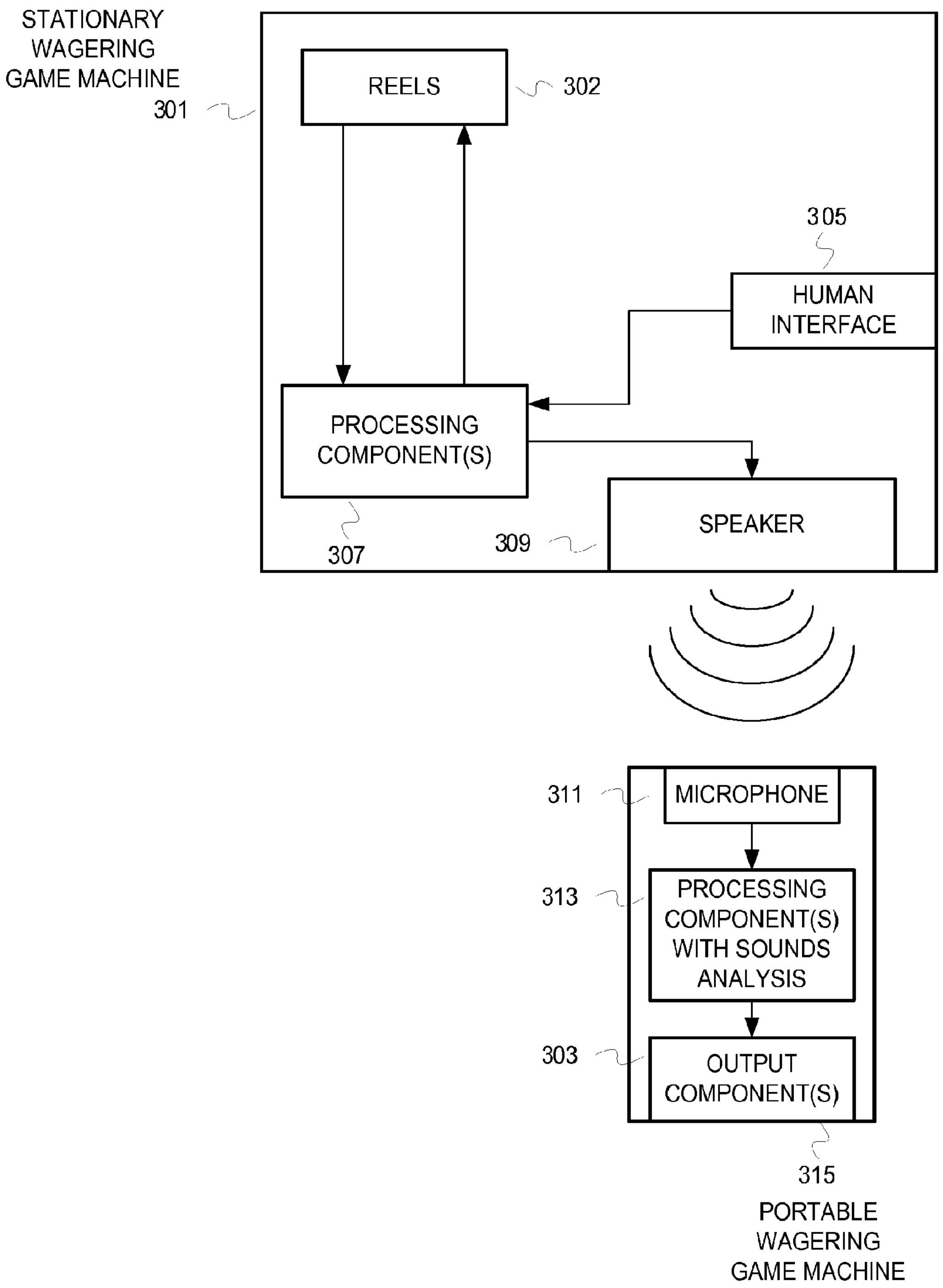
FIG. 3 depicts an example of a portable wagering game machine detecting a game event at a stationary wagering game machine with audible output from the stationary wagering game machine.

A PGM may also detect game events at a SGM without communicating with an accounting system and/or wiring into an SGM. FIG. 3 depicts an example of a portable wagering game machine detecting a game event at a stationary wagering game machine with audible output from the stationary wagering game machine. A stationary wagering game machine 301 includes reels 302, processing components 307, a human interface 305 (e.g., button, handle, etc.), and a speaker 309. A portable wagering game machine 315 includes a microphone 311, a processing component(s) 313 with sound analysis capability, and an output component 303. When a game event occurs at the SGM 301, the SGM 301 outputs an indication of the game event, such as an auditory indication (e.g., sirens sounds, a melody, etc.). Perhaps, the SGM 301 outputs different auditory indications for different types of game events. The PGM 303 detects the auditory indications with the microphone 311. The auditory indications may be converted to digital representation of the auditory indication and passed to the processing component(s) 313. If appropriate, the PGM 301 invokes a game event (e.g. a bonus round) that is indicated with the output component 303 (e.g., sound is played, animation is displayed, etc.). Winnings for the game event at the PGM 301 may be credited at the PGM 301 or communicated to a back-end accounting system for later pay out. Detecting game events based on auditory indications allows the PGM and the SGM to provide game content together without modification to the SGM.

Figure 4:
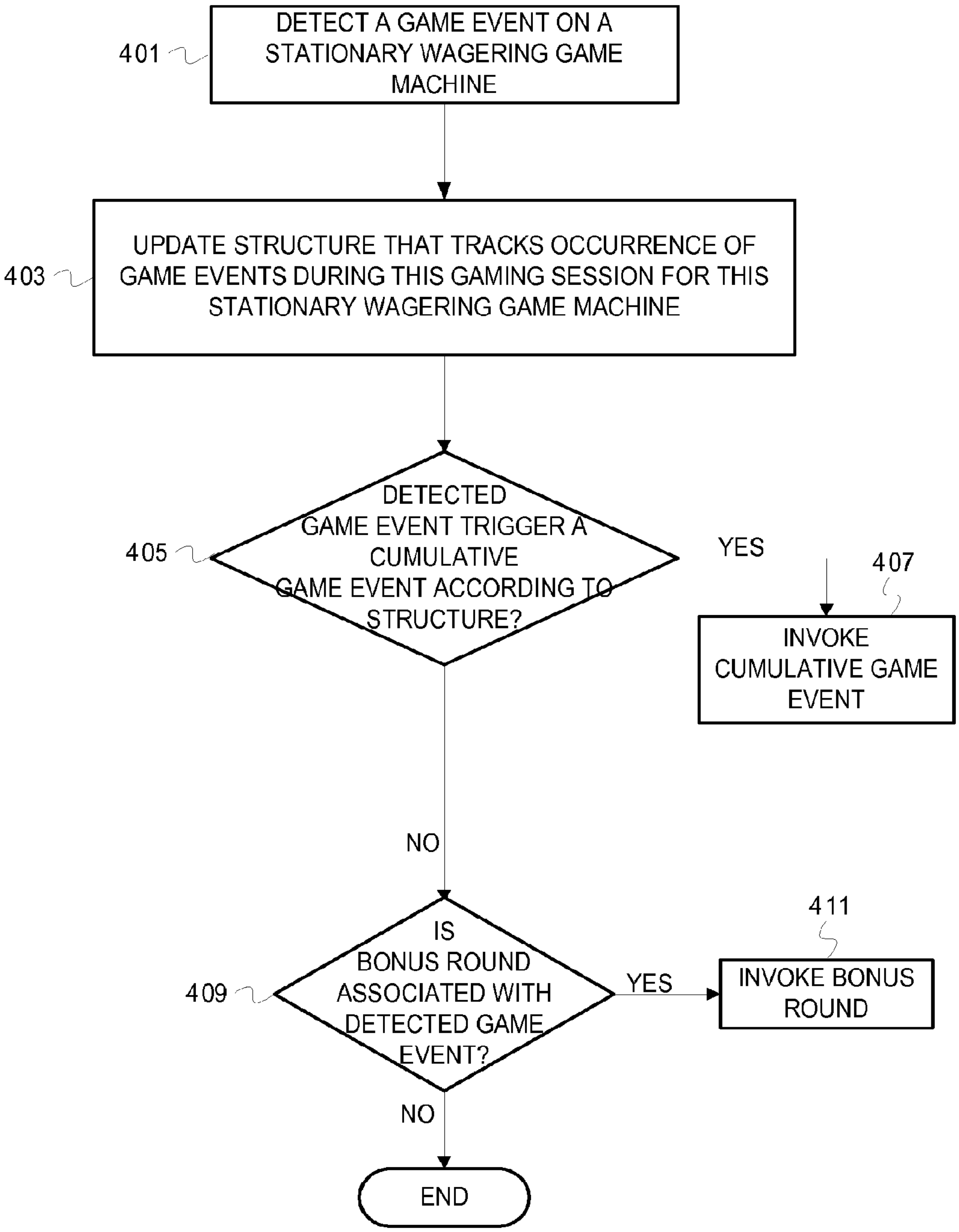
FIG. 4 depicts a flowchart of example operations for invoking a game event at a portable wagering game machine responsive to detecting a game event at a stationary wagering game machine.

FIG. 4 depicts a flowchart of example operations for invoking a game event at a portable wagering game machine responsive to detecting a game event at a stationary wagering game machine. At block 401, a PGM detects a game event on a stationary wagering game machine. At block 403, the PGM updates a structure that tracks occurrence of game events during a particular game session at the SGM. For instance, each time a PGM is associated with a SGM, the PGM initializes the structure. When a game event that occurs at the SGM is detected by the PGM, then the structure is updated to reflect occurrence of the SGM game event. The tracking mechanism allows for various features, such as escrow type games, diverse bonus rounds for different reel combinations or game events, etc.

At block 405, the PGM determines whether the detected game event triggers a cumulative game event (e.g., escrow game event, piggybank game event, etc.) according to the structure. If the detected game event triggers a cumulative game event, then control flows to block 407. If the detected game event does not trigger a cumulative game event, then control flows to block 409.

At block 407, the PGM invokes a cumulative game event.

At block 409, the PGM determines if a bonus round is associated with the detected game event. If a bonus round is associated with the detected game event, then control flows to block 411. If not, then the operations end. At block 411, the PGM invokes the bonus round.

Figure 5:
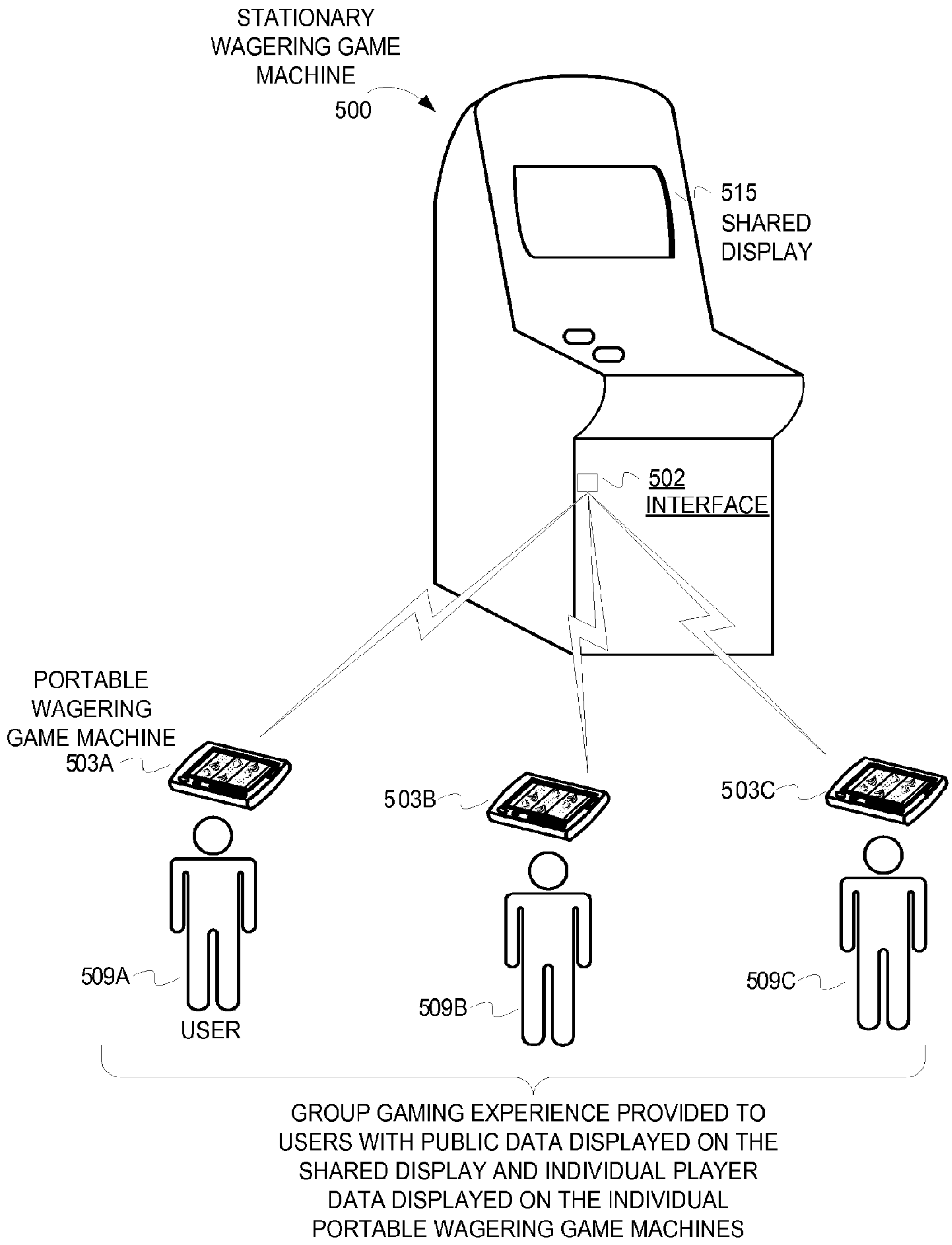
FIG. 5 depicts a portable wagering game machine and multiple stationary wagering game machines providing a group type wagering game experience.

Pooling of resources of a PGM and a SGM may do more than augment or supplement game content at an SGM. Pooling resources of the PGM and the SGM may also allow for group type wagering games. FIG. 5 depicts a portable wagering game machine and multiple stationary wagering game machines providing a group type wagering game experience. PGMs 503A-503C are associated with a SGM 500. The SGM 500 includes a display 515 and an interface 502 (e.g., wireless interface). Data for a group wagering game is passed between the SGM 500 and the PGMs 503A-503C via the interface 502. Data for viewing by a particular user are displayed at a particular PGM. In FIG. 5, data for viewing by users 509A-509C are respectively displayed at the PGMs 509A-509C. Data for display to all of the users 509A-509C are displayed at the display 515.

A variety of group wagering games can take advantage of this sharing of resources between multiple PGMs and a SGM. For example, the numbers selected by individuals for keno may be presented on respective PGMs while numbers selected by the system are presented on the SGM. As another example, a virtual roulette wheel may be displayed on the SGM with player's selected numbers indicated on PGM displays. Many other existing games (e.g., poker) and new wagering games can leverage the shared resources, but separate displays of such a configuration.

Figure 6:
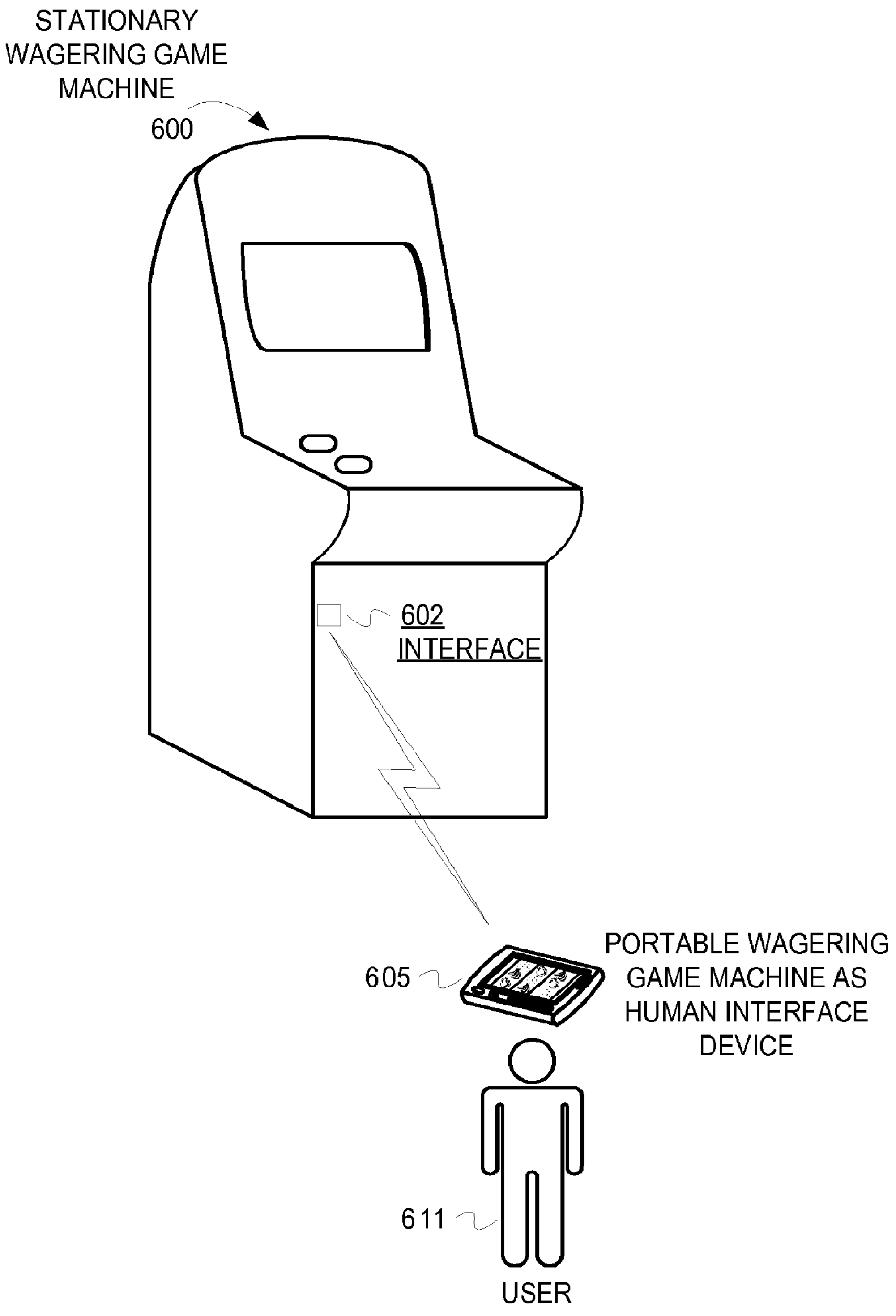
FIG. 6 depicts an example of a portable wagering game machine being used as a human interface device for a SGM.

A PGM may be used for more than processing and display, though. A PGM may also be used as a human interface device for a SGM. FIG. 6 depicts an example of a portable wagering game machine being used as a human interface device for a SGM. A SGM 600 includes an interface 602. FIG. 6 depicts wireless communication between the SGM 600 and a PGM 605 via the interface 602. Even though a wireless communication is depicted, the interface 602 may be a serial port, a parallel port, etc.

A user 611 may use the PGM 605 in a number of ways as a human interface device. The PGM 605 may include functionality and/or components for a variety of human interface devices, be programmed by flashing memory in the PGM 605 when checked out by the user 611, query the SGM 600 to determine or be programmed for a particular human interface device functionality, etc. Examples of human interface devices that the PGM may operate as include a touch screen, game wand, remote control, etc. For instance, the user 611 may enter selections or wager amounts with the PGM 605. The user 611 may sit in a massage chair while using the PGM 605 as a remote control to play the SGM 600.

Figure 7:
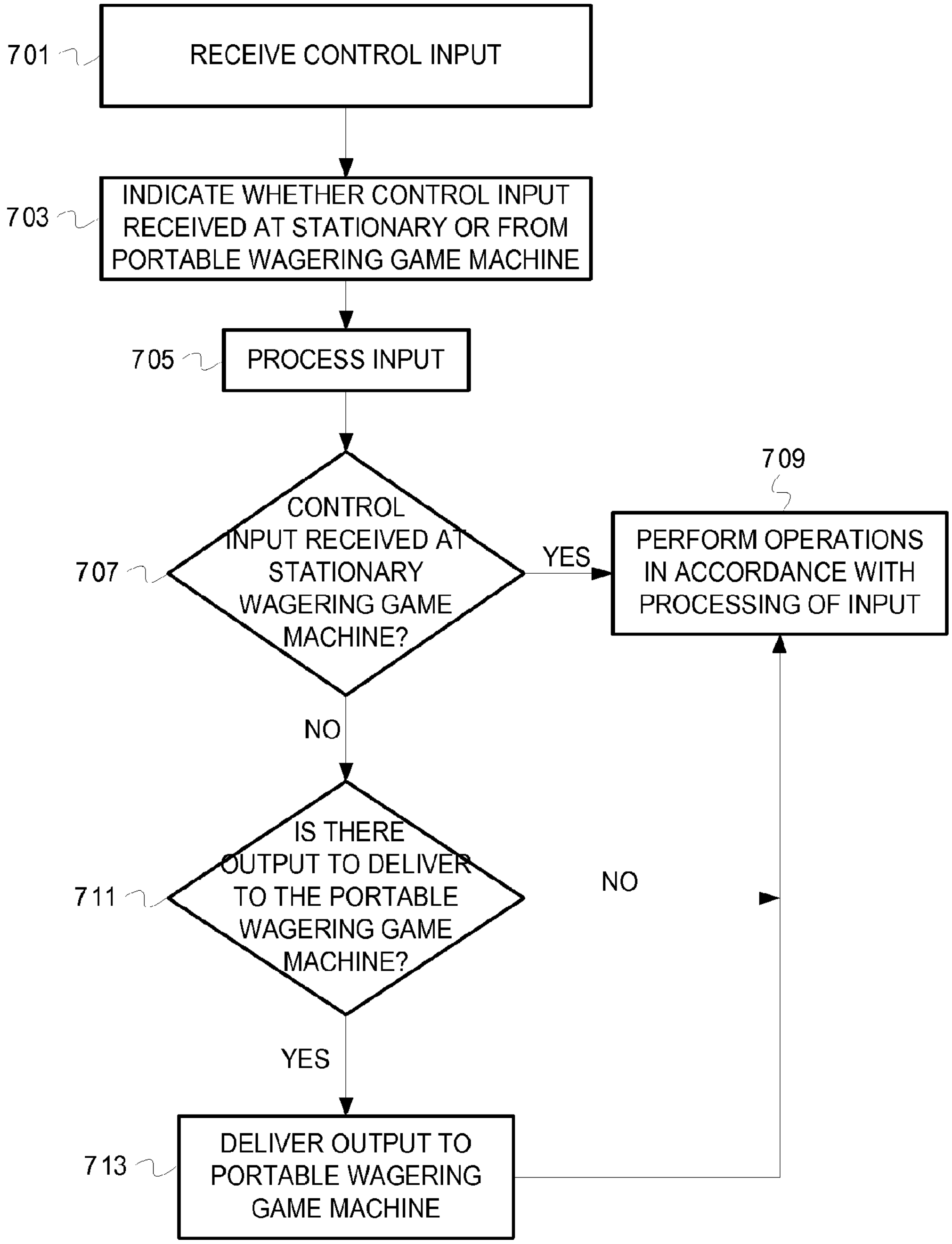
FIG. 7 depicts a flowchart of example operations for a stationary wagering game machine to process control input from a portable wagering game machine.

FIG. 7 depicts a flowchart of example operations for a stationary wagering game machine to process control input from a portable wagering game machine. At block 701, a SGM receives control input. At block 703, the SGM indicates whether the received control input is received at the SGM or from a PGM. For example, the SGM sets a flag in a data structure.

At block 705, the control input is processed. At block 707, the SGM refers back to the indication made at block 703 to determine whether the control input was received at the SGM or from a PGM. If the control input was received from a PGM, then control flows to block 709.

At block 709, the SGM performs operations in accordance with the processing performed at block 705 (e.g., updates a display, spins reels, etc.).

At block 711, the SGM determines if there is any output from the processing to deliver to the PGM. If there is no output to deliver then, control flows to block 709. If there is output to deliver, then control flows to block 713.

At block 713, the output is delivered to the PGM. Control flows from block 713 to block 709.

Providing a wagering game experience with the resources of both a PGM and a SGM is not limited to using the PGM as a human interface device or augmenting and/or supplementing game content of a SGM. A PGM and SGM may interact to add other functionality to provide a wagering game experience to a user. For instance, a PGM may add electronic funds transfer functionality. In addition, the PGM and the SGM together may provide a wagering game experience with hospitality services related functionality.

Figure 8:
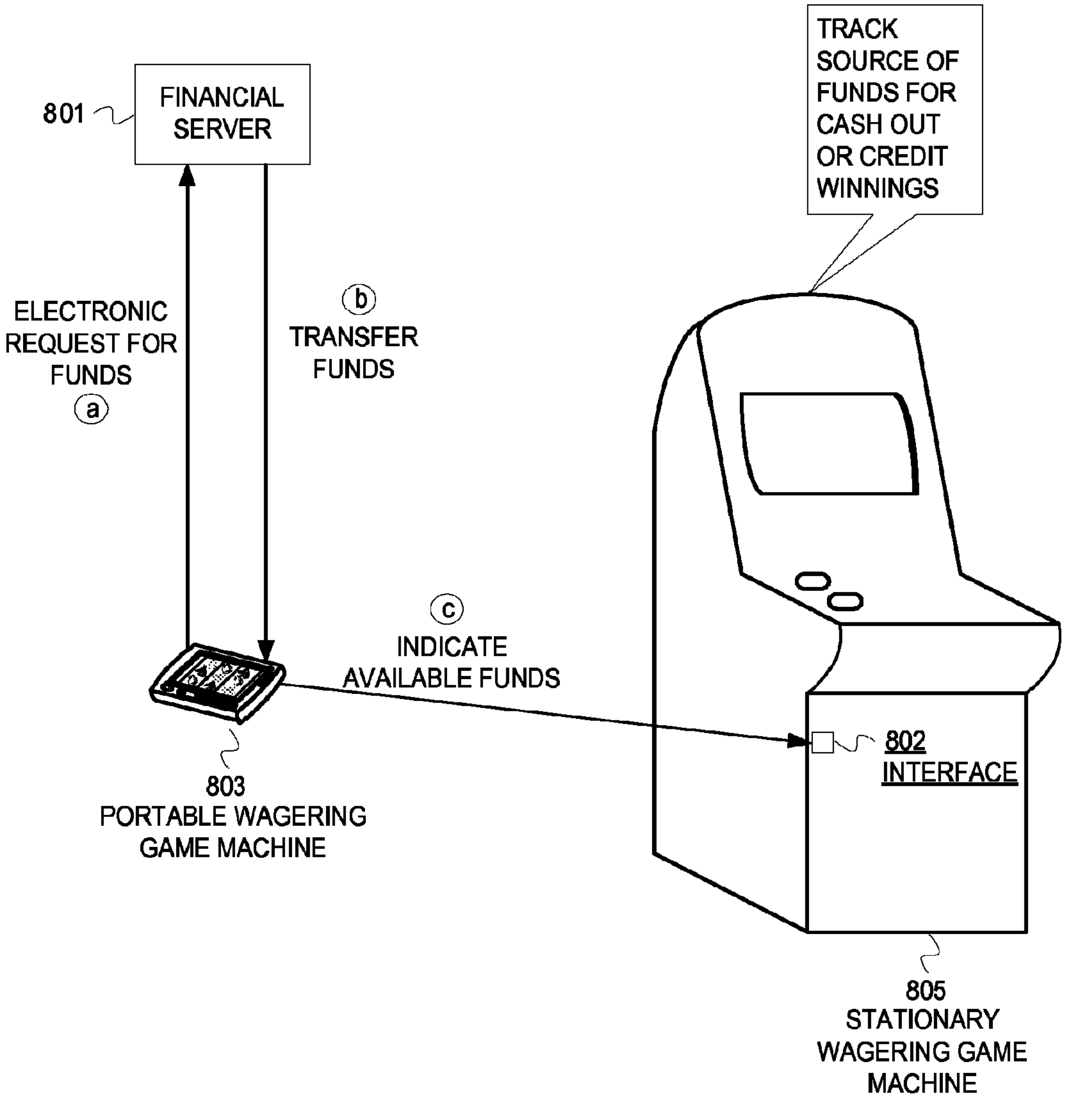
FIG. 8 depicts an example of a portable wagering game machine adding electronic funds transfer functionality to a stationary wagering game machine.

FIG. 8 depicts an example of a portable wagering game machine adding electronic funds transfer functionality to a stationary wagering game machine. At a time a, a PGM 803 sends an electronic request for funds to a financial server 801 (e.g., a system capable of accessing a user's financial account). The financial server 801 transfers funds to the PGM 803 at a time b. Of course, other servers may be involved and/or the funds may be transferred by a server other than the financial server 801. At a time c, the PGM 803 indicates funds available from the funds transfer to a SGM 805 via an interface 802 on the SGM 805. The SGM 805 keeps track of the source of the funds (i.e., the PGM 803) for cash out and/or pay out. So, the SGM 805 can credit the PGM 803 or pay cash.

The transfer of funds and credits can be implemented in a variety of ways. For example, the funds may actually be transferred to a casino account created for a player. The funds are represented at a PGM, but actual funds are withdrawn and/or deposited to the casino account (i.e., an account remote from the PGM). In another example, the funds are put into an escrow and a final amount withdrawn or deposited to a player's account when the player settles (e.g., has finished playing for the day).

Figure 9:
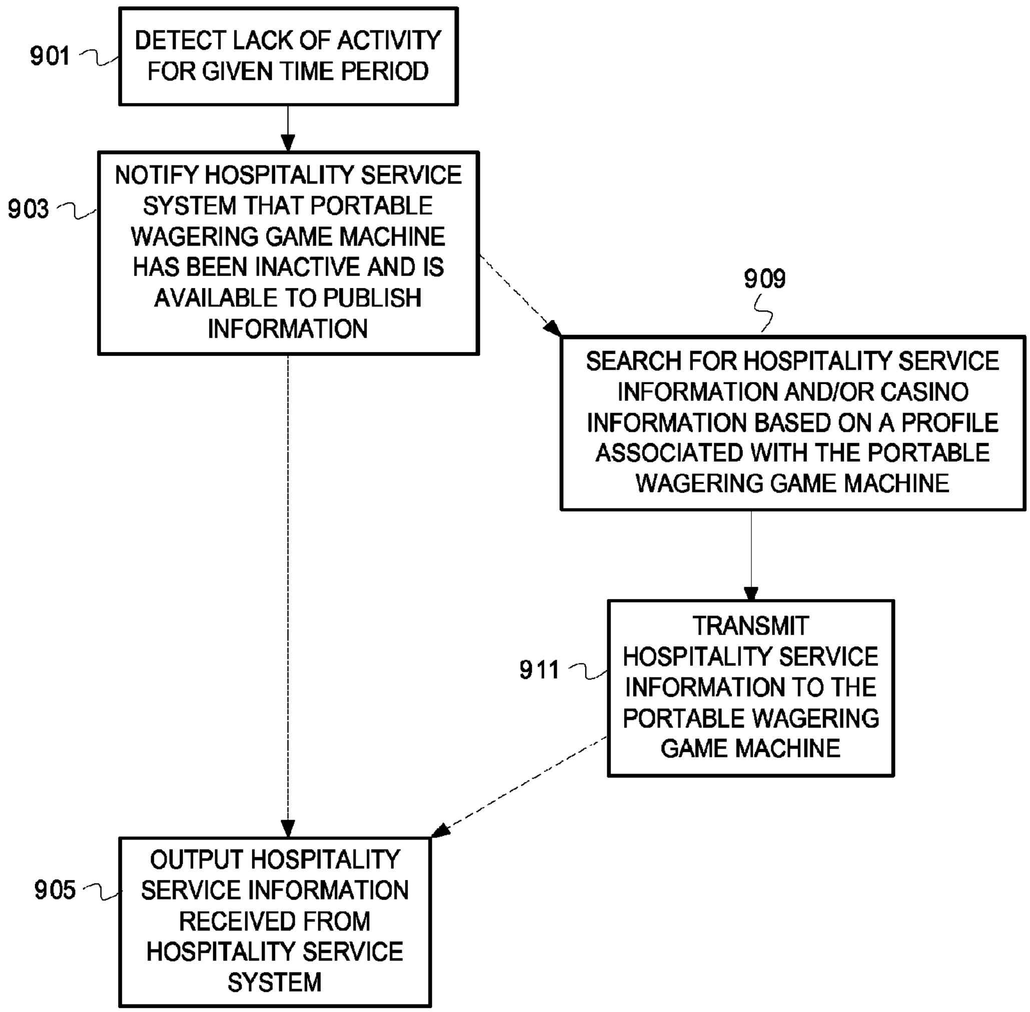
FIG. 9 depicts an example flowchart of example operations for publishing information for hospitality services or casino announcements.
Figure 10:
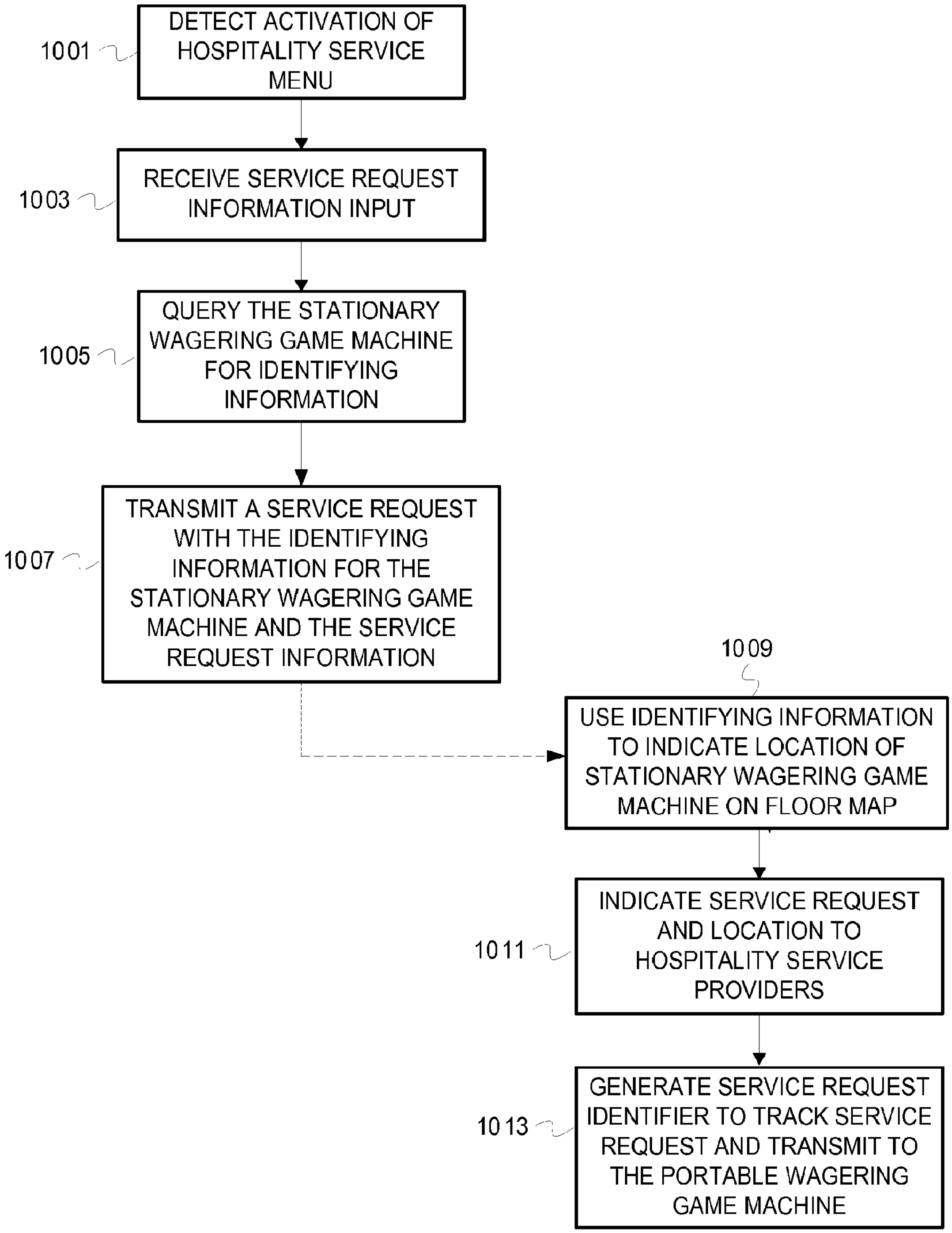
FIG. 10 depicts a flowchart of example operations for locating customers for hospitality services.

FIGS. 9 and 10 depict flowcharts of example operations for hospitality services. FIG. 9 depicts an example flowchart of example operations for publishing information for hospitality services or casino announcements. At block 901, a PGM detects a lack of activity (e.g., a given amount of time has expired without any activity). At block 903, the PGM notifies a hospitality service system that the PGM has been inactive and is available for publishing information.

At block 909, the hospitality service system searches for hospitality services information and/or casino announcements based on a profile of a user associated with the PGM.

For example, the hospitality service system accesses a database to determine who has checked out the PGM and then accesses a profile for that user. In another example, the PGM transmits the profile or an identifier of the user that checked out the PGM to the hospitality system.

At block 911, the hospitality service system transmits information yielded from the search to the PGM. Examples of the information include information about new wagering games, open tables, show times, advertisements for beverages, advertisements for cigars, etc.

At block 905, the PGM outputs the information received from the hospitality service system (e.g., audio, video, animation, text, etc.). The PGM may output or publish the information for a given time period, until the PGM is activated for wagering game use, until disassociated from a stationary wagering game machine, until associated with a wagering game machine, interruption by a user, etc.

FIG. 10 depicts a flowchart of example operations for locating customers for hospitality services. At block 1001, a PGM detects activation of a hospitality service menu on the PGM. At block 1003, the PGM receives service request information input by a user. At block 1005, the PGM queries a SGM associated with the PGM for information that identifies the SGM. At block 1007, the PGM transmits a service request to a hospitality service system. The service request includes the information that identifies the SGM and the service request information or some form of the service request information (e.g., the input from a user is encoded for the hospitality service system).

At block 1009, the hospitality service system uses the information that identifies the SGM to indicate location of the SGM. At block 1011, the hospitality services system indicates the service request and location of the SGM to a hospitality service provider. For example, an electronic floor map is updated to highlight the located SGM and display the service request. In another example, a text message is transmitted to a hospitality service provider in proximity of the SGM.

At block 1013, the hospitality service system generates a service request identifier for the service request and transmits the service request identifier to the PGM. The service request identifier can be used to track the service request. If the PGM status changes (e.g., the user moves to a different SGM), the PGM may use the service request identifier to notify the hospitality service system of the change in location or lack of association with a SGM. The hospitality service system may suspend servicing the service request, cancel the service request, request a location update within a given time period, etc.

It should be understood that the operations depicted in the flowcharts are meant to aid in understanding embodiments of the invention and should not be used to limit embodiments. For example, block 709 of FIG. 7 may be performed before or in parallel with block 707. In FIG. 10, block 1005 may be performed prior to block 1001 (e.g., the PGM reads an RFID tag on the SGM when near the SGM).

In addition to providing a wagering game experience, a portable wagering game machine can be docked with a stationary wagering game machine for configuration of the stationary wagering game machine. The portable wagering game machine may be used to update game content, change game content, modify game parameters, etc. The portable wagering game machine may also be used to copy game content between stationary wagering game machines or write game content to a blank stationary wagering game machine.

The described embodiments may be provided as a computer program product, or software, that may include a machine-readable medium having stored thereon instructions, which may be used to program a computer system (or other electronic device(s)) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 11:
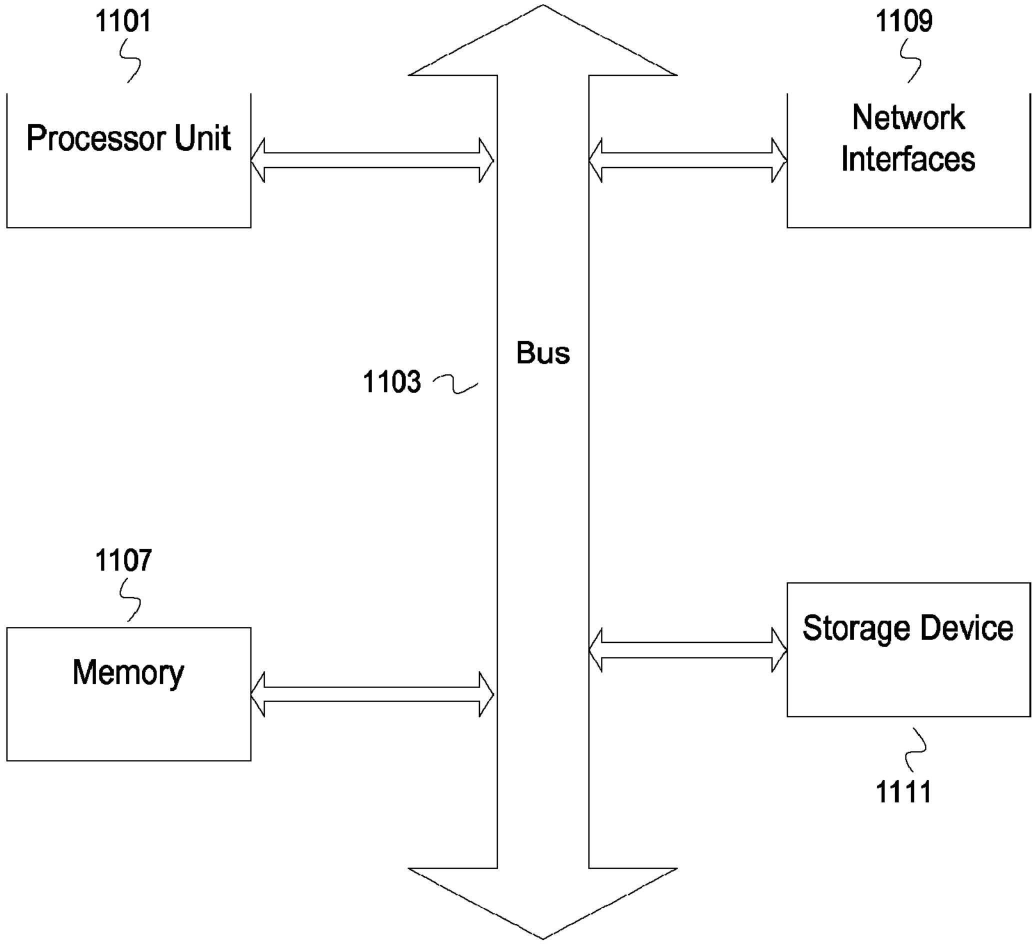
FIG. 11 depicts an example portable wagering game machine.

FIG. 11 depicts an example portable wagering game machine. A portable wagering game machine includes a processor unit 1101 (possibly including multiple processors, multiple cores, multiple nodes, and/or implementing multi-threading, etc.). The portable wagering game machine includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The portable wagering game machine also includes a bus 1103 (e.g., PCI, ISA, PCI-Express, HyperTransport®, InfiniBand®, NuBus, etc.), a network interface 1109 (e.g., an ATM interface, an Ethernet interface, a Frame Relay interface, SONET interface, wireless interface, etc.), and a storage device(s) 1111 (e.g., optical storage, magnetic storage, etc.). The system memory 1107 embodies functionality to implement embodiments described above. The system memory 1107 may include one or more functionalities that facilitate the embodiments described herein. Any one of these functionalities may be partially (or entirely) implemented in hardware and/or on the processing unit 1101. For example, the functionality may be implemented with an application specific integrated circuit, in logic implemented in the processing unit 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101, the storage device(s) 1111, and the network interface 1109 are coupled to the bus 1103. Although illustrated as being coupled to the bus 1103, the memory 1107 may be coupled to the processor unit 1101.

While the embodiments are described with reference to various implementations and exploitations, it will be understood that these embodiments are illustrative and that the scope of the invention(s) is not limited to them. In general, techniques for providing a wagering game experience with resources of both a PGM and a SGM as described herein may be implemented with facilities consistent with any hardware system or hardware systems. Many variations, modifications, additions, and improvements are possible.

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole. This detailed description does not, therefore, limit embodiments of the invention, which are defined only by the appended claims. Each of the embodiments described herein is contemplated as falling within the inventive subject matter, which is set forth in the following claims.

What is claimed is:

1. A method comprising:

determining that a portable wagering game machine has been inactive for a given time period while docked with a stationary wagering game machine via a physical interface, wherein the portable wagering game machine is associated with a user account;

responsive to said determining that the portable wagering game machine has been inactive for a given time period while docked with the stationary wagering game machine via the physical interface, transmitting profile information to a hospitality services system, wherein the profile information is associated with the user account;

receiving hospitality services related information from the hospitality services system, wherein the received hospitality services related information is based on the profile information;

publishing the received hospitality services related information to the portable wagering game machine via the physical interface.

2. The method of claim 1, wherein said publishing comprises at least one of emitting audio, displaying text, displaying animation, displaying video, and displaying images.

3. The method of claim 1 further comprising communicating to the hospitality services system, after said determining that the portable wagering game machine has been inactive for the given time period, that the portable wagering game machine is available for publishing hospitality services related information.

4. The method of claim 1 further comprising determining that the portable wagering game machine was checked out with the user account.

5. A stationary wagering game machine comprising:

a processor;

a network interface;

a docking interface for docking a portable wagering game machine with the stationary wagering game machine;

a non-transitory medium having program instructions stored thereon, the program instructions executable by the processor to cause the processor to, determine that a portable wagering game machine, which is associated with a user account, has been inactive for a given time period while docked with the stationary wagering game machine via the docking interface;

collect hospitality services information from a hospitality services system based, at least in part, on information associated with the user account responsive to a determination that the portable wagering game machine has been inactive for the given time period; and publish the collected hospitality services information to the portable wagering game machine via the interface.

6. The system of claim 5 further comprising program instructions executable by the processor to cause the processor to communicate identifying data to the portable wagering game machine, wherein the identifying data identifies the stationary wagering game machine.

7. A non-transitory medium having program instructions stored thereon, the program instructions comprising:

program instructions configured to, determine that a portable wagering game machine has been inactive for a given time period while docked with a stationary wagering game machine via an interface;

determine profile information associated with a user account used for checking out the portable wagering game machine;

transmit the profile information to a hospitality services system after a determination that the portable wagering game machine has been inactive for the given time period while docked with the stationary wagering game machine;

receive hospitality services related information from the hospitality services system, wherein the received hospitality services related information is based on the profile information; and publish the received hospitality services related information to the portable wagering game machine while docked with the stationary wagering game machine.

8. The non-transitory medium of claim 7, wherein the program instructions configured to publish the received hospitality services related information to the portable wagering game machine comprises the program instructions configured to, at least one of, emit audio, display text, display animation, display video, and display images.

9. The non-transitory medium of claim 7 further comprising program instructions configured to communicate to the hospitality services system, after the determination that the portable wagering game machine has been inactive for the given time period, that the portable wagering game machine is available for publishing hospitality services related information.

10. The non-transitory medium of claim 7, wherein the program instructions configured to determine the profile information associated with a user account use to check out the portable wagering game machine comprises the program instructions configured to determine that the portable wagering game machine was checked out with the user account.

* * * * *